US005639964A

United States Patent [19]
Djorup

[11] Patent Number: 5,639,964
[45] Date of Patent: Jun. 17, 1997

[54] THERMAL ANEMOMETER AIRSTREAM TURBULENT ENERGY DETECTOR

[76] Inventor: Robert S. Djorup, 20 Lovewell Rd., Wellesley, Mass. 02181

[21] Appl. No.: 327,968

[22] Filed: Oct. 24, 1994

[51] Int. Cl.[6] ............................................. G01F 1/68
[52] U.S. Cl. .................... 73/170.12; 73/861.65; 73/861.85
[58] Field of Search .................. 73/170.12, 170.14, 73/170.02, 182, 183, 861.65, 861.85, 204.22, 204.24, 204.25

[56] References Cited

U.S. PATENT DOCUMENTS

| | | | |
|---|---|---|---|
| 2,701,474 | 2/1955 | Goudy | 73/170.14 |
| 3,079,758 | 3/1963 | Vogel et al. | |
| 3,251,057 | 5/1966 | Buehler et al. | |
| 3,402,295 | 9/1968 | Astheimer | |
| 3,407,688 | 10/1968 | Babson et al. | |
| 3,604,261 | 9/1971 | Olin | 73/170.12 |
| 4,070,908 | 1/1978 | Newell | 73/170.12 |
| 4,184,149 | 1/1980 | Baker et al. | 73/861.65 |
| 5,195,046 | 3/1993 | Gerardi et al. | 73/583 |
| 5,233,865 | 8/1993 | Rossow | 73/861.65 |
| 5,357,795 | 10/1994 | Djorup | 73/170.12 |
| 5,385,069 | 1/1995 | Johnson | 73/579 |

OTHER PUBLICATIONS

Flomenhoft, "Brief History of Gust Models for Aircraft Design", J. Aircraft, vol. 31, No. 5: Engineering Notes (pp. 1225–1227).

Ducvharme, et al., "The Feasibility of Using a Hot–Film Anemometer in the Rain", American Metereological Society, (Oct. 1994) (pp. 1415–1419).

David Hughes, "Design, Checks Cited in Crash", Aviation Week & Space Technology (Nov. 1, 1993), (pp. 39–42).

Edward H. Phillips, "New Sensors Reduce Wind Shear Risks", Aviation Week & Space Technology (Oct. 18, 1993), (p. 53).

Frederic M. Hoblit, "Gust Loads on Aircraft: Concepts and Applications", AIAA Education Series (1988).

Ralph E. Huschke, "Glossary of Meteorology", American Meteorological Society, Boston, MA (1959).

Richard J. Goldstein "Fluid Mechanics Measurement", Hemisphere Publishing Corp. (1983).

Houbolt, et al. "Dynamic Response of Airplanes to Atmospheric Turbulence Dincluding Flight Data on Input and Response", NASA, Washington, DC (Jun., 1964).

Kitchin, et al. "RMS To DC Conversion Application Guide, 2nd Edition", Analog Devices, Inc. (1986).

"Special Linear Reference Manual", Analog Devices, Inc.

Lumley, et al. "The Structure of Atmospheric Turbulence", Interscience Publishers (1964).

Tennhekes, et al. "A First Course in Turbulence", The MIT Press, Cambridge, MA (1972).

Omega Complete Flow & Level Measurement Handbook and Encyclopedia, vol. 28. copyright 1992.

*Primary Examiner*—Richard Chilcot
*Assistant Examiner*—Harshad Patel
*Attorney, Agent, or Firm*—Choate, Hall & Stewart

[57] ABSTRACT

A turbulence sensor whose signal output is processed to substantially reduce accumulated turbulence signal bandwidth and provide a permanent stored record in which maximum information content is preserved while a minimum of data samples are recorded. Both turbulence energy and turbulence intensity sensors are disclosed. Aircraft mounting of multiple sensors together with correlation monitoring relating to airframe structural integrity prediction is disclosed. A turbulence energy sensor for ground monitoring of conditions such as wake vortex and wind shear turbulence as well as cyclonic system detection in remote geographic areas is also disclosed. An aircraft turbulence sensor, combining a fast response thermal anemometer airspeed transducer together with a ducted thermal anemometer direction transducer sensing angle-of-attack is disclosed.

11 Claims, 5 Drawing Sheets

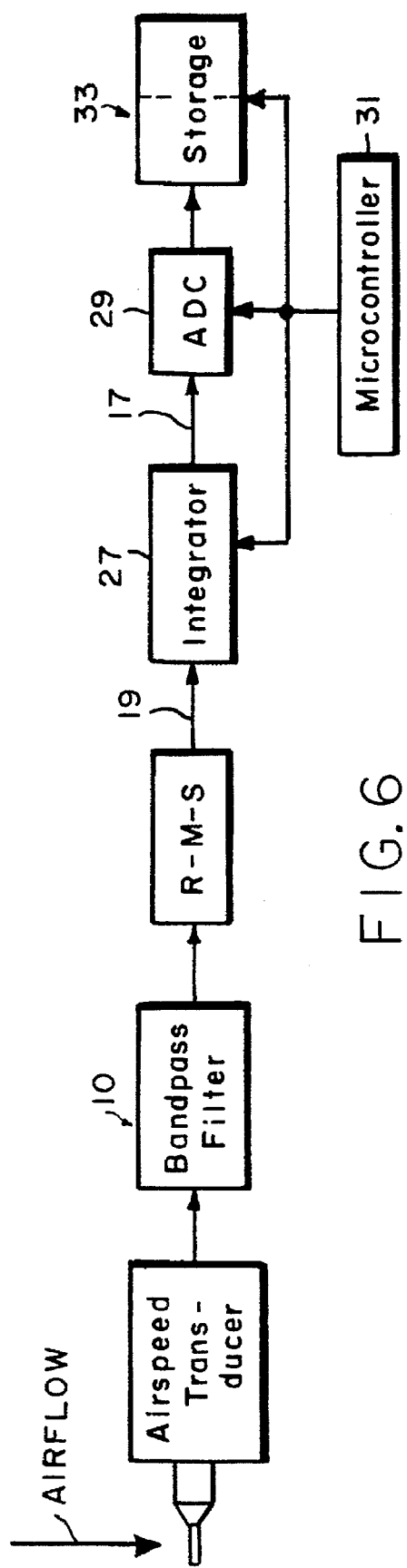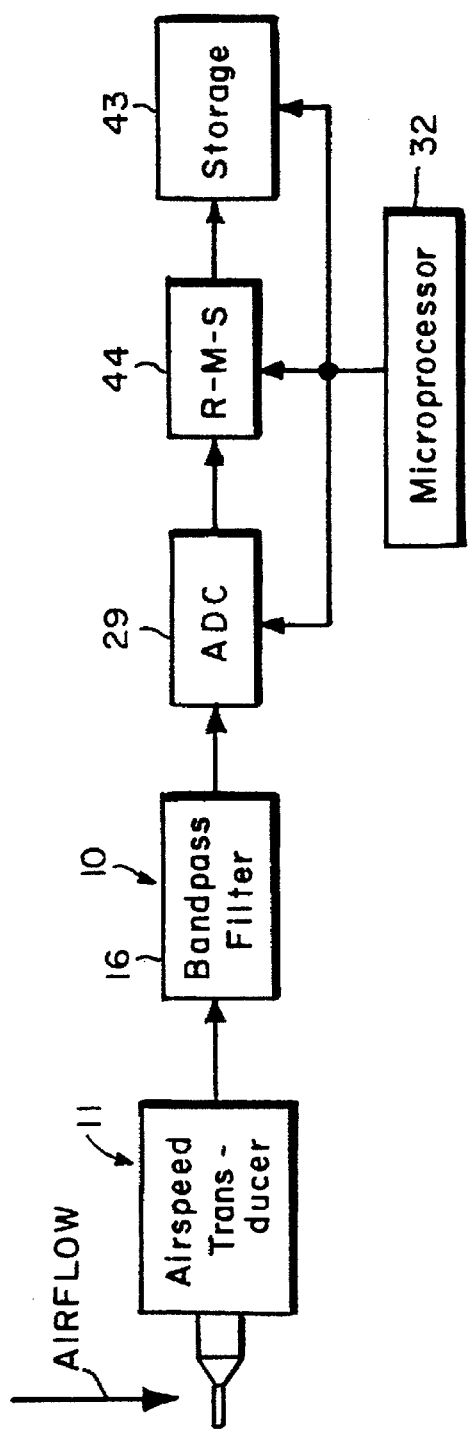
FIG. 6
FIG. 7

THERMAL ANEMOMETER AIRSTREAM TURBULENT ENERGY DETECTOR

TECHNICAL FIELD

The invention relates generally to improved airspeed transducer apparatus for determining and reporting turbulence energy and turbulence intensity for use on aircraft and in the ground environment. The invention discloses a turbulence sensor whose signal output is processed by either analogue or digital means to substantially reduce accumulated turbulence signal bandwidth and provide a permanent stored record in which maximum information content is preserved while a minimum of data samples are recorded. A time-history is thus obtained of the lifetime exposure of an airframe to in-flight atmospheric turbulence disturbances that may occur only for a very small portion of total flight time. Such a time-history can facilitate structural inspection and fatigue prediction. The invention further discloses aircraft mounting of multiple turbulence sensors together with correlation monitoring to provide warning of a possible impending loss of a portion of airframe structural integrity. Both turbulence energy sensors and more complex turbulence intensity sensors are disclosed. The simpler turbulence energy sensor may be applied in the ground environment to airport runway wake vortex and low level wind shear measurements as well as cyclonic system detection in remote geographic areas.

BACKGROUND ART

A considerable amount of time and effort has been expended respecting atmospheric turbulence measurement and attempts at prediction of atmospheric turbulence by many commercial, civil, and military organizations since all aircraft are affected by turbulence while they are operating. Many different sensing and signal acquisition techniques have been used, ranging from radar to laser radar, from laser velocimetry to Lidar, from hot wire anemometry to pressure tube anemometry, from passive to active acoustic sounding, from infrared to microwave radiometers, and on. Most equipment thus far is very costly, is highly complex, and is usually too large and cumbersome for general field usage or aircraft installation. Relatively little has been done respecting actual exposure monitoring of an aircraft to inflight turbulent airflow and most aircraft presently use near center-of-gravity located remote reading accelerometers for such measurements, recording continuous data on a flight recorder or its equivalent.

A summary of the current state-of-the-art of turbulent velocity measurements from aircraft, used in present day aircraft design practice, is given on pages 22, 23, 62, 63 and 170 of the book entitled "Gust Loads on Aircraft: Concepts and Applications", by Frederic M. Hoblit, published in 1988 by the American Institute of Aeronautics and Astronautics, Inc., Washington, D.C., ISBN 0-93403-45-2.

A flow direction sensor for aircraft that senses angle-of-attack and sideslip by means of a served sphere with pressure difference ports is disclosed by U.S. Pat. No. 3,079,758. Fluctuating changes in indicated attitude with respect to aircraft motion has been used in computing turbulence from the vertical and lateral components.

A ground-based air-turbulence detection system using radar techniques is disclosed by U.S. Pat. No. 3,251,057.

An airborne infrared process for spectral scanning of the atmosphere ahead of an aircraft is disclosed by U.S. Pat. No. 3,402,295. At that time it was disclosed that temperature discontinuities could be measured as an aid in locating turbulent air.

A turbulence indicator for aircraft that used inertial displacement of a mass within the indicator is disclosed by U.S. Pat. No. 3,407,668.

An airframe is an elastic non-linear mechanism and atmospheric turbulence sensing apparatus at or near the center-of-gravity or center-of-motion sees the aircraft's response to a random disturbance input through a constantly changing non-linear filter, the aircraft structure itself. Variables, such as aircraft speed, wing loading, fuel consumption, flight attitude, passenger and cargo load changes, wing lift-curve slope, and the like, all contribute to the non-linear characteristics of the elastic airframe. These variables affect the inaccuracies of an indirect measurement of turbulence exposure.

Historically, qualitative pilot reports are used to describe the characteristics of in-flight turbulence and different pilots in the same aircraft can report different results. Research turbulence instrumentation, true gust instrumentation, generally utilizes boom-mounted angle-of-attack and sideslip vanes for accurate time-histories during turbulence encounters. Such systems are not economically feasible when continuous measurement is desired during routine flight operations for long term observation of structural integrity as a contributor to flight safety. It is desirable that turbulence variations are sensed so that the aircraft operator may benefit from a time-history of the aircraft's exposure to randomly encountered turbulence during normal flight operations for the service life of the aircraft. The same aircraft type on two different repetitive routes can see wildly different total accumulated exposure to en-route turbulence. Flight over large land masses with mountain ranges and varied terrain, such as across the continental United States, can be quite different than long transoceanic flights although the flight durations may be the same. Presently, airframe useful life is determined linearly by totalizing the number of flight hours and by counting the number of takeoff-landing cycles. Inspections are carded on in linear fashion as well, ignoring the fact that the aircraft operates in a non-linear environment, a random environment biased by route structure.

Existing pitot-static airspeed sensing systems are able to sense longitudinal turbulence variations in some instances, provided that their pneumatic lines are blown clear of moisture and debris and the associated pressure transducer is sufficiently responsive. Pilot-static tube measurement of the vertical component of airspeed, from a fixed position an the airplane, is limited at best.

Turbulent atmospheric conditions also randomly exist at ground level and aircraft trailing wake vortex turbulence, shed from the aircraft during take-off and landing, is of great concern. Low level wind shear and microbursts are also of concern near and around airports and these are at the top of the list of recognized aviation hazards. An unrelated turbulent condition is found in the presence of cyclonic systems such as squall line induced vorticity, tornadoes, hurricanes and typhoons. In these instances measurements are presently made by the use of conventional anemometer wind sets and Doppler radar, if available. Conventional wind sets rely on mechanical moving components such as propellers, cups, and vanes, and are subject to overspeeding and inertial forces, and are also relatively fragile. Most are incapable of response fast enough to sense turbulence with any precision.

A primary object of the instant invention is to provide a significant improvement in the measurement of local airspeed turbulence from aircraft or on the ground and thus enable a determination of turbulence energy, or more precisely, turbulence eddy kinetic energy, and turbulence intensity.

Another object is to provide a permanent stored record of either turbulence intensity or turbulence energy in which maximum information content is preserved while a minimum of data samples are recorded.

A further object is to provide an aircraft turbulence reporting system that may be used to continuously verify the structural integrity of an aircraft airframe.

Yet a further object is to provide a simple measurement of turbulence energy in combination with a more conventional wind speed measurement.

Still another object is to provide a severe weather alarm that is triggered by a measurement of background turbulence energy exceeding a preset limit, together with wind speed.

SUMMARY OF THE INVENTION

The instant invention provides a significant improvement in the monitoring and measurement of atmospheric turbulence by aircraft and on the ground by substantially reducing the accumulated signal bandwidth of continuous turbulence information of interest and by also providing an alarm monitor that is operated by use of the acquired measurement of turbulence energy or turbulence intensity. By its very nature turbulence is random, broadband, and unpredictable in form and intensity. An attempt to continuously measure and record turbulence on an operating aircraft inevitably results in an accumulation of an overwhelming amount of data, very little of which are related to any turbulence encounters of interest. It is helpful to look at a definition of turbulence intensity for assistance in simplifying the continuous measurement problem.

An expression for turbulence intensity taken from the American Meteorological Society 1959 "Glossary of Meteorology", edited by Ralph E. Huschke, is given under "gustiness components" on page 266 as, "The ratios of the root-mean-square of the eddy velocities to the mean wind speed":

$$g = \frac{\sqrt{\overline{u^2}}}{U}$$

in which g is gustiness or turbulence intensity, u is eddy velocity or turbulence, and U is mean wind speed or mean airspeed.

Simply put, turbulence intensity is equal to turbulence energy divided by mean airspeed.

Two approaches to the implementation of the invention are disclosed where these, in turn, are accomplished by analogue computation means and by digital computation means. The first approach discloses a turbulence energy sensor that uses the numerator of the above expression. The second approach discloses a turbulence intensity sensor that solves the entire equation. On the ground it is appropriate to apply the measurement of turbulence energy thereby avoiding zero wind condition calculations and infinite values of turbulence intensity. In aircraft operations it can be equally appropriate to use either turbulence energy or turbulence intensity as indicators of exposure to disturbed air since a mean airspeed component is always present.

Most airspeed transducers have non-linear response characteristics and whether one chooses to use raw airspeed signals in a piecewise linear look at turbulence values or use linearized airspeed signals to obtain a truer measurement is a matter of choice that depends also on the turbulence disturbance range. Early aircraft design criteria used much smaller values of turbulent airspeed components but more recent flight experience has shown a need to use significantly larger values that sometimes approach mean airspeed readings in extreme cases. This suggests that linear airspeed data are to be preferred for comparisons between different airframes and different aircraft types.

The instant invention also discloses successive stages of bandwidth reduction, measuring energy and energy accumulations over a period of time, for storage and recording purposes in order to reduce the total amount of data needed to be stored without losing the energy exposure time-history. It is shown that the entire life history of an aircraft fitted with the disclosed sensor or sensors can be contained in a very small storage device like an IC or integrated circuit chip.

The invention further discloses means for correlation of the output of plural turbulence sensors, mounted on different places on an aircraft that experience similar airflow, which serve to detect changes in the airframe structure that can cause a failure for sensor outputs to correlate in the expected fashion when the airframe is intact. Such failure to correlate sensed outputs can be caused by fatigue cracking in major structural members such as lifting surface attachment forgings, engine pylon attachment elements and the like.

In a further embodiment a basic form of turbulence energy sensor is used to detect rapid local wind motion changes near the ground, as an alarm. Such changes are experienced in the presence of different turbulence forms, as in the case of airport runway wake vortex turbulence generated by aircraft operations, low level wind shear which can be brought about by squall lines, downdrafts and microbursts against the ground, and similar phenomena where turbulence energy increases are sudden and often unpredictable. On a much larger scale, a network of simple turbulence energy sensors, often kilometers apart along uninhabited coastal regions, for example, can be used to signal passage of disturbed air masses in the absence of more costly conventional weather reporting stations.

BRIEF DESCRIPTION OF THE DRAWING

FIG. 6 is a block diagram of a turbulence energy sensor made in accordance with the principles of the present invention showing analogue signal processing and digital storage.

FIG. 7 is a block diagram of a turbulence energy sensor made in accordance with the principles of the present invention showing digital signal processing and digital storage.

BEST MODE OF CARRYING OUT THE INVENTION

Figure 1:
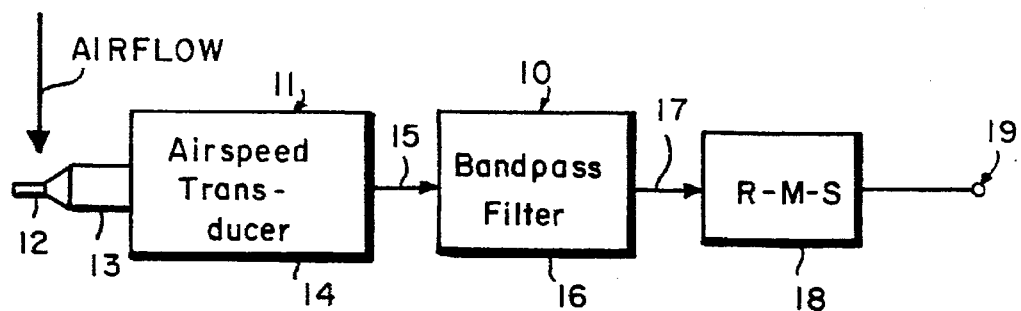
FIG. 1 is a block diagram of the essential components of a turbulence energy sensor made in accordance with the principles of the present invention.

Referring now to the drawing, and in particular to FIG. 1, the numeral 10 generally designates a turbulence energy sensor constructed in accordance with the principles of the present invention. In a preferred embodiment, airspeed transducer 11 is shown represented as a thermal anemometer with sensing element 12 supported by a post or pylon 13 with sensing element drive and readout electronics 14 providing a dynamic airspeed signal at 15. This disclosure of a preferred embodiment will characterize turbulence energy sensor 10 as mounted horizontally on an aircraft, although it can just as well be at a fixed point on the ground with sensing element 12 mounted vertically.

The direction of airflow for airspeed transducer 11 is in a plane perpendicular to the axis of sensing element 12. With flow from any azimuth within the plane, sensing element 12 output 15 will always be the same for constant airspeed. Sensing element 12 response sensitivity to flow from outside the normal flow plane can be predetermined by selecting its length-to-diameter ratio when designed and fabricated. A detailed discussion of the design of the cylindrical sensing element 12 is taught by co-pending U.S. patent application Ser. No. 08/032,682.

A cylindrical thermal anemometer sensing element 12 is equally responsive to flow from all directions in the plane perpendicular to the axis of the element. Where this plane is oriented as the vertical fore-aft plane parallel to the longitudinal axis of an aircraft, the sensor 10 will uniformly detect all flow variations in that plane without distortion or degradation with sensing element 12 axis mounted horizontally. A length-to-diameter ratio can be chosen so that little distortion is experienced by lateral flow variations contained in the airflow and swept past the sensing element. Such near-ideal omnidirectional responsiveness helps to sense all turbulence variations affecting the aircraft.

Figure 10:
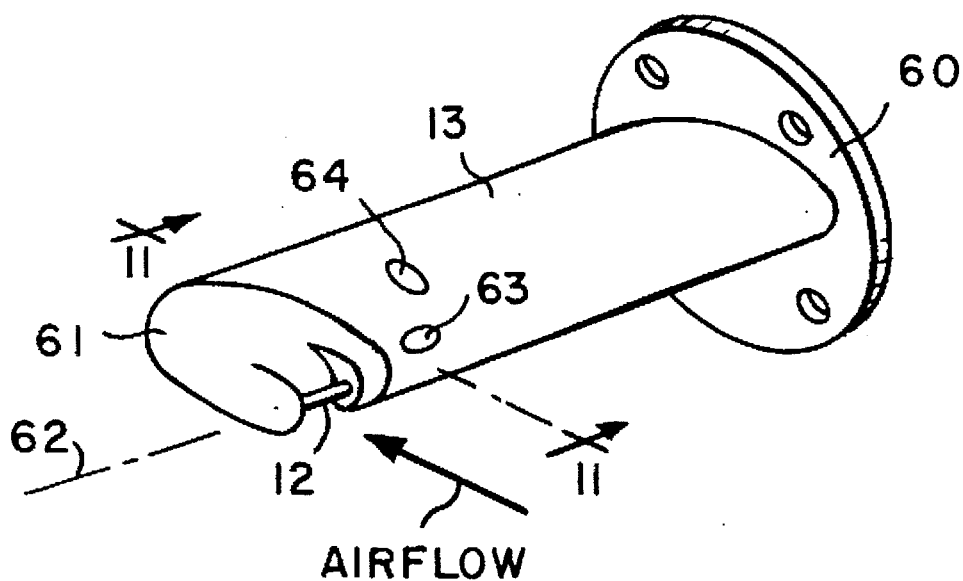
FIG. 10 is a perspective view of an aircraft turbulence sensor airspeed transducer combined with a ducted thermal anemometer angle-of-attack transducer.

For aircraft installation, sensing element 12 can be a stainless steel encased unit thereby providing protection from rain and particle erosion with time. FIG. 10 depicts pylon 13 construction supporting sensing element 12 perpendicular to the direction of mean airflow. Flange 60 provides pylon 13 attachment to an aircraft fuselage surface. Typical sensing element 12 diameter can be 3 millimeters with a length of 9 to 15 millimeters, supported by tubular or airfoil cross-section shaped pylon support 13 that can be about 75 to 190 mm length, placing sensing element 12 outside the fuselage boundary layer when horizontally mounted on the side of an aircraft fuselage, near the nose, in the region usually occupied by the airspeed pitot-static tube and total temperature probes. When mounted in this way, airspeed transducer 11 will sense mean airspeed as well as all variations in longitudinal, vertical, and lateral airspeed, seen by the aircraft, with optimum sensitivity.

Although a preferred embodiment uses a thermal anemometer as airspeed transducer 14, other transducer types can be used. A pitot-static tube, together with a differential pressure transducer to read the difference between static pressure and impact pressure, is the standard means to determine aircraft airspeed. Generally, a pitot-static airspeed sensing system is specified that does not rely on electrical power for operation in emergency situations and the differential pressure transducer is usually not fast responding. For turbulence measurements, a fast response differential pressure transducer is needed and extreme care must be given to the design of the pneumatic pressure lines since they can act as lowpass filters, losing dynamic pressure changes. Water accumulation in the fine tubular pressure lines can also affect dynamic operation while little affecting mean airspeed readings.

Another type of airspeed transducer that can be used is a vortex-shedding transducer that senses the Von Kármán vortex street shed by a barrier or post where vortex curl frequency changes as a function of changing airspeed.

Thermal anemometer, pitot-static tube, and vortex-shedding airspeed transducers are described on pages 99–145, 61–73, and 262–263, 366–370, respectively, of a book entitled "Fluid Mechanics Measurements", edited by Richard J. Goldstein and published in 1983 by Hemisphere Publishing Corporation, New York, ISBN 0-89116-244-5.

Most airspeed transducers are non-linear devices and produce output signals that can rectify or seriously distort any turbulence components that are sensed. It is good engineering practice to linearize non-linear signals before any filtering or computation is done so that distortion and errors are minimized.

Figure 2:
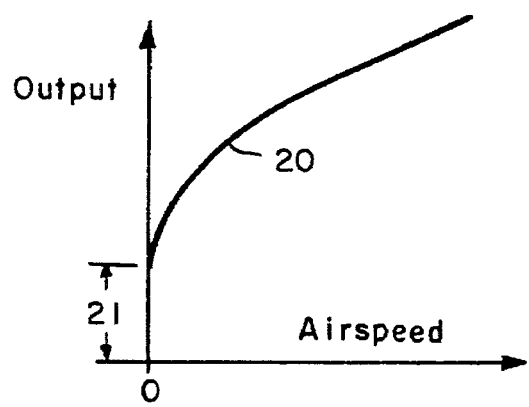
FIG. 2 is a diagram showing a typical transfer function for a thermal anemometer transducer.

FIG. 2 illustrates typical response that may be expected by a thermal anemometer, where the signal 20 is an approximate fourth root with respect to airspeed increase. An offset 21 is present, owing to sensing element heating at zero airspeed. Greatest sensitivity is at low speeds with lessening sensitivity as speed is increased. The non-linear output curve 20 cups downward.

Figure 3:
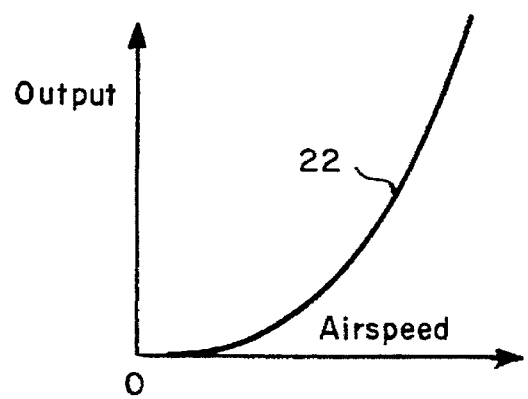
FIG. 3 is a diagram showing a typical transfer function for a pitot-static tube with differential pressure transducer output.

FIG. 3 illustrates typical response that may be expected by a pitot-static tube where the signal 22, a pressure difference, follows a square law with respect to airspeed increase. The nonlinear output curve 22 cups upward with greatest sensitivity at high speed and least sensitivity at low speeds. Below 30 knots or so, pitot-static tube pressure differences are difficult to read with precision and if speed measurement down to zero airspeed is desired, use of a thermal anemometer transducer is to be preferred.

When linearization is required it is customarily carried on within the airspeed instrument. With a linear dynamic airspeed signal, measurement of turbulence energy becomes independent of mean airspeed. With a non-linear dynamic airspeed signal one is constrained to only small excursions about the mean airspeed signal before waveform distortions render any measurements meaningless if large excursions are encountered.

Airspeed transducer 11 output is passed through a bandpass filter 16 that is used to shape and limit the frequency response of turbulence energy sensor 10. The lower frequency limit eliminates mean airspeed, by a highpass filter section, while the upper frequency limit eliminates higher frequency turbulence that appears as noise, by a lowpass filter section. The combination provides a band of turbulence frequencies of interest that may be determined by examining the airplane flight environment. We are concerned only with turbulence that has dimensions or space wavelength that is significant respecting aircraft dimensions. To determine the filter characteristic frequencies use expression:

$$f = \frac{U}{\lambda}$$

in which f is frequency in cycles per second,
U is mean airspeed, and
λ is space resolution wavelength.

This expression assumes that a turbulence pattern can be characterized by harmonic frequencies and thus the airspeed transducer dynamic response is directly related to its space resolution. In this way space resolution wavelength and harmonic wavelength can be considered to be the same. The wavelengths of interest range from aircraft dimensions to the very much longer atmospheric gravity waves, cumulus clouds, roll turbulence, lee waves, and the like.

Typical aircraft dimensions for present generation aircraft show wingspans that range from 21.40 meters for a Saab 340, to 32.90 meters for a McDonnell Douglas MD-81, to 59.60 meters for a Boeing 747-357, and fuselage lengths of 19.70, 45.10, and 70.60 meters, respectively. Typical wavelengths for disturbed air are taken in the range of 50 feet to 10,000 feet or 15.24 meters to 3,048 meters.

Figure 4:
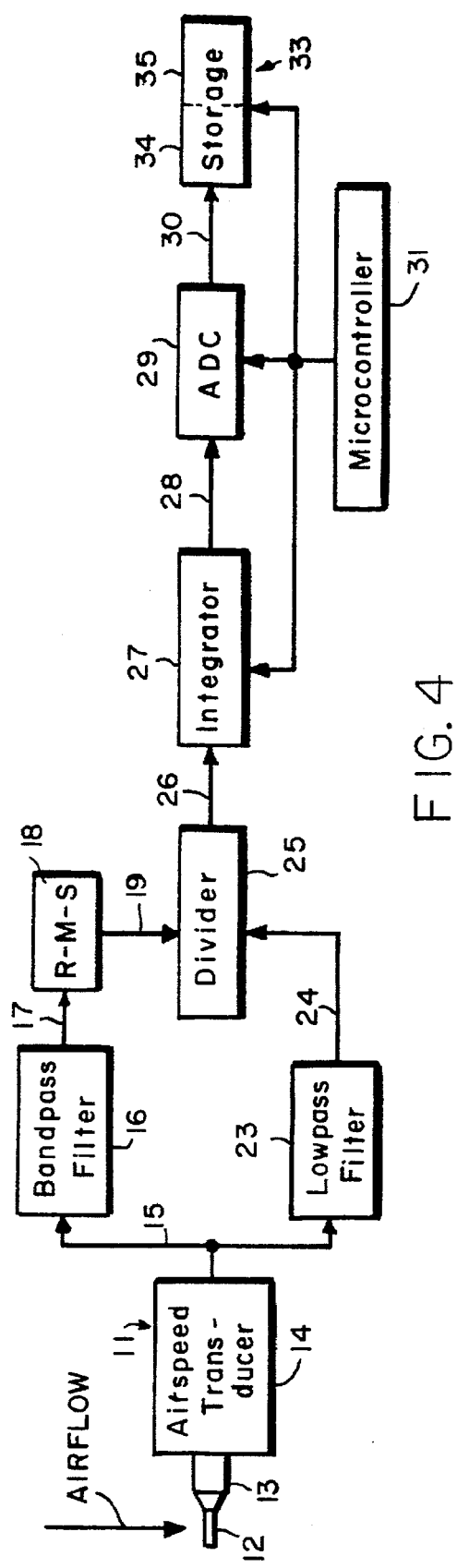
FIG. 4 is a block diagram of a turbulence intensity sensor made in accordance with the principles of the present invention showing analogue signal processing and digital storage.

Turbulence power spectra are usefully presented in the helpful and informative NASA Technical Report NASA TR R-199, June 1964, entitled "Dynamic Response of Airplanes to Atmospheric Turbulence Including Flight Data on Input and Response", by John C. Houbolt, Roy Steiner, and Kermit G. Pratt of Langley Research Center, Virginia. FIG. 4 on page 10 and Table V.-Vibration Sources on page 113 are particularly useful.

Maximum airspeeds given for the above three aircraft types range from 540 to 1020 kilometers per hour. The lowest airspeeds for such aircraft can usually be defined at the stall buffet speed below which lift is lost. It can range as low as 150 kilometers per hour for some aircraft. Business aircraft and light aircraft present a different group of dimensions and airspeeds.

If the largest airplane is used as an example, and the shortest wavelength is used at stall buffet speed, the longest wavelength at maximum airspeed, with a range of airspeed from 77.25 to 283.33 meters per second, and with a wavelength from 15 to 3000 meters, the equivalent frequencies are found to be 0.094 cps to 5.15 cps, agreeing with the NASA Table V. A bandpass filter 16 meeting these characteristics can easily be constructed using operational amplifiers, resistors, and capacitors, such electrical design techniques being well known in the art. The upper and lower frequency limits of bandpass filter 16 can be set by Sallen-Key filter designs with cut-off slopes of −12 dB per octave or −40 dB per decade, quite effectively defining the filter pass band. Bandpass filter 16 output 17 contains only the airspeed fluctuating component of interest and its root-mean-square value is measured 18, providing a measurement of waveform energy content at output 19.

Computing the true root-mean-square value of a random waveform gives an exact measure of the power or energy in the signal, regardless of the wave shape. Earlier indicating instruments presented rectified averages that are accurate only for sine wave inputs. Modern RMS-to-DC converters, such as the Analog Devices,Inc. AD637, are particularly well suited to such measurements and the AD637 can be easily adapted to the very low frequencies that are typically encountered at the output 17 of bandpass filter 16. Measurement of frequencies between 0.09 cps and 5 or 10 cps can be accomplished with the AD637 connected in a way to greatly reduce the size of the required averaging capacitor and this is shown under the section "Low Frequency Measurements" by FIG. 15 on page 4-30 of the manufacturer's data sheet Rev. A, included within the Analog Devices "Special Linear Reference Manual", dated 1992.

Airspeed transducer 14 electronics, bandpass filter 16, and root-mean-square measuring circuit 18 can be constructed, using modern off-the-shelf integrated circuit and electronic components, to occupy a volume of about 50 cubic centimeters or three cubic inches. Such physical sizing permits the electronics to be located close to pylon 13 or it may even be included within pylon 13 support structure itself as a self-contained unit with power in, root-mean-square measured airstream turbulence signal out.

It is helpful to refer to the "RMS to DC Conversion Application Guide", 2nd Edition, by Charles Kitchin and Lew Counts, published by Analog Devices, Inc. in May 1986, for a thorough review of RMS measurements.

Output 19, as a measurement of turbulence energy, is in a condition where the enormous data bandwidth of inflight encountered atmospheric turbulence is in a manageable form for later recording, computation, or data processing. Root-mean-square turbulence energy 19 can also be used in real time to signal the level of local turbulence activity as it is sensed while turbulence energy sensor 10 is operated on the ground as a fixed sensor. Operating bandwidth is determined in much the same fashion as for an aircraft installation. It is helpful to assign a lower velocity threshold limit to the measurement as an aid to bandpass filter 16 design since a zero velocity measurement of local wind speed has little meaning in the context of turbulence energy measurement.

FIG. 4 is a simplified block diagram illustrating a second embodiment of the instant invention disclosing a turbulence intensity sensor. Analogue signal processing is shown for measurement of turbulence energy, as in FIG. 1, and further computation is accomplished together with data storage to provide a record of turbulence exposure time-history.

Bandpass filter 16 provides turbulence signal 17 from airspeed transducer 11 output 15 which is a composite signal containing mean airspeed and turbulence components. Lowpass filter 23 provides a mean airspeed signal 24 from airspeed transducer output 15. The cutoff frequency of lowpass filter 23 is chosen to be equal to or less than the lower cutoff frequency setting of bandpass filter 16 so that no turbulence is present in mean airspeed signal 24 in the form of short term fluctuations. Divider 25 denominator input signal 24 is mean airspeed and numerator input 19 is turbulence energy taken from root-mean-square measurement 18 of bandpass filtered turbulence signal 17. Quotient 26 is fed to electrical integrator 27 that integrates a continuous analogue measurement of turbulence intensity. Integrator 27 reset timing is under control of microcontroller 31 which also controls analogue-to-digital converter 29, abbreviated as ADC, providing digital data 30 to digital storage 33.

Sampled data theory postulates that at least two samples per cycle are required to define a varying signal. When airspeed transducer bandpass filter output 17 is sampled, using the above aircraft example, 10.30 samples per second are required to define a 5.15 cycle per second signal. Clearly, continuous sampling and recording can accumulate an enormous amount of data. Integrator 27 can accumulate measured turbulence intensity 26 for several minutes or even several hours, depending on the quality of the integrating capacitor and other components used in integrator circuit construction. If a sample is used to represent a portion of the aircraft's flight history, a one minute sample of turbulence exposure corresponds to 17 kilometers travelled distance, five minutes corresponds to 85 kilometers, and ten minutes corresponds to 170 kilometers travelled, by a Boeing 747-357 at maximum airspeed. With a single sample taken of integrator 27 output 28 every ten minutes, some 240,000 samples are needed to disclose 40,000 hours time-history for a particular airplane's total flight operations. Each sample represents the total energy exposure of the aircraft for the duration of the integration period. In smooth flight the energy sample will be negligible. During turbulent flight the energy sample becomes significant.

Analogue-to-digital converter 29 periodically samples the integrator 27 output 28 under control of microcontroller 31 which resets integrator 27 to zero when each sample is converted to digital form. Microcontroller 31 is used in this embodiment mainly to provide timing and control functions.

The sampled digital output 30 is fed to storage 33 which can be in two parts, 34 and 35, where the first part 34 is dynamic memory that can be in the form of RAM, random-access-memory, and the second part 35 is permanent storage in the form of ROM, or read-only-memory. It should be noted that with longer integration time less dynamic memory capacity is needed for temporary storage before the permanent storage is loaded with a sample. Long integration times require expensive component parts and careful construction. Turbulence sensor ambient environmental requirements may suggest shorter integration times, minutes, not hours.

The permanent storage 35 includes periodic samples of the aircraft flight history and a single storage unit can be interrogated periodically during maintenance periods to aid in aircraft inspection and servicing. Storage 35 can be a small thumbnail sized programmable read-only-memory module or ROM, CD-ROM or compact disc ROM, optical disc storage, continuous magnetic tape or similar rugged storage device. It is helpful, where a permanent record is desired, to use only recording devices that are written once per sample location and are not erasable.

Figure 5:
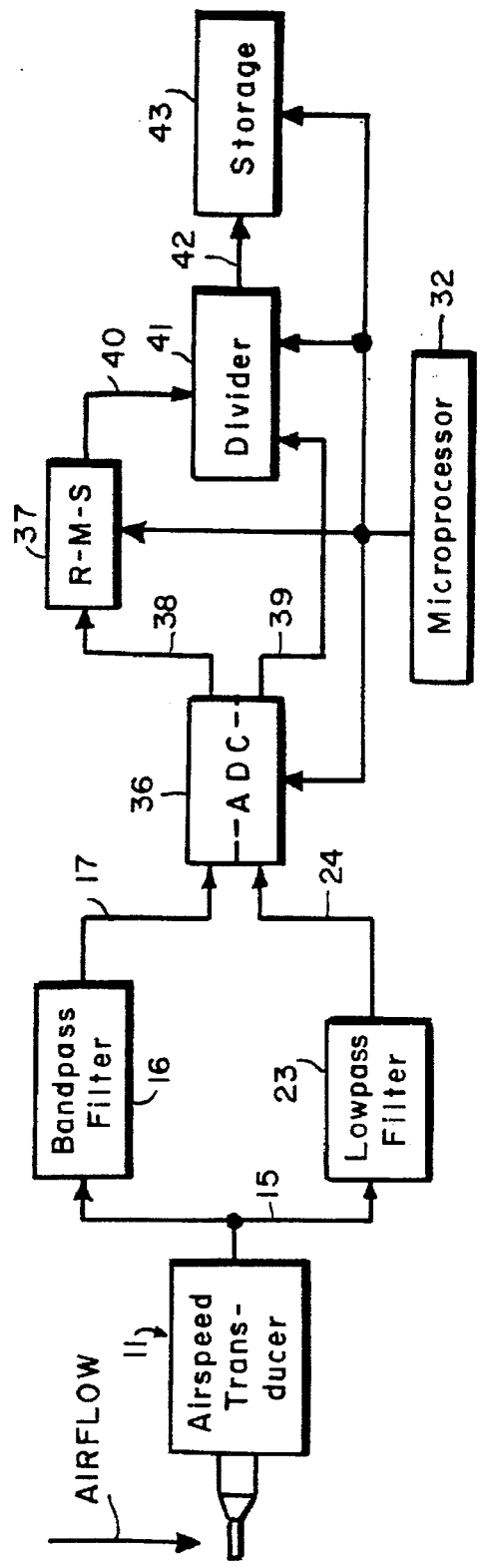
FIG. 5 is a block diagram of a turbulence intensity sensor made in accordance with the principles of the present invention showing digital signal processing and digital storage.

FIG. 5 is a simplified block diagram illustrating a third embodiment of the instant invention, disclosing a turbulence intensity sensor. Digital signal processing is shown for measurement and computation of turbulence energy, division of turbulence energy by mean airspeed, and digital storage of the result.

As in FIG. 4, airspeed transducer 11 output 15 is followed by bandpass filter 16 and lowpass filter 23, and their outputs, 17 and 24, are converted to digital signals 38 and 39, respectively, by analogue-to-digital converter 36. Analogue-to-digital converter 36 can either be comprised of two converters, one for each input signal, 17 and 24, or one converter preceded by a two input multiplexer, with converter 36 providing turbulence signal 38 to root-mean-square measurement 37, thence to a divider stage 41 where mean airspeed signal 39 is divided into turbulence energy signal 40. Divider 41 output 42 is fed to storage 43 for entry into a permanent record as described in the above disclosed second embodiment. Microprocessor 32 provides timing, control, and computation for all functions following airspeed signal component inputs 17 and 24. Intermediate data sample accumulation and integration is accomplished digitally so as to obtain the reduced bandwidth time-history result obtained by the above disclosed second embodiment of the invention.

FIG. 6 discloses an embodiment of the invention that combines the turbulence energy sensor 10 of FIG. 1 with signal 19 integration and storage disclosed in the embodiment illustrated by FIG. 4, including integrator 27, analogue-to-digital converter 29, multi-part storage 33 and microcontroller 31. Analogue signal handling is shown until turbulence energy output 17 is digitized, preparatory for digital storage. As above, microcontroller 31 is used as a controller for timing, ordering of digitized data into storage 33, and integrator 27 resetting, readying integrator 27 for the subsequent sample period in turbulence energy signal accumulation.

FIG. 7, like FIG. 6, discloses an embodiment of the invention that combines the forward portion of turbulence energy sensor 10 of FIG. 1, shown by airspeed transducer 11 and bandpass filter 16, followed by a transposition of the root-mean-square computation means 44 with analogue-to-digital converter 29, eliminating analogue signal integration. Microprocessor 32 is used for computation and control within the digital portion of the turbulence energy sensor, entering data samples into storage 43.

Figure 8:
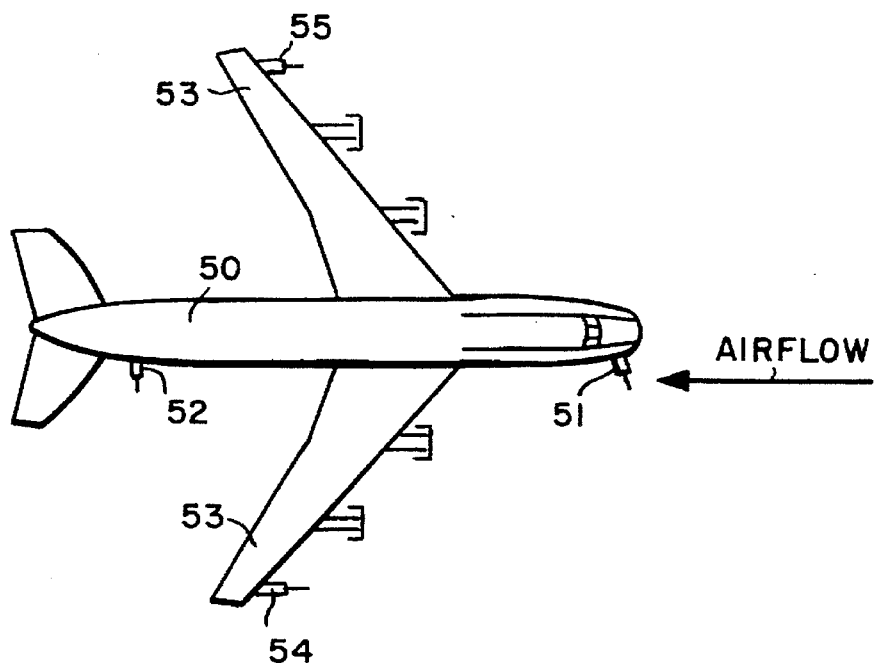
FIG. 8 is a simplified plan view of a heavy jet aircraft showing turbulence sensor airspeed transducer mounting locations in accordance with the principles of the present invention.

FIG. 8 depicts a simplified plan view of a heavy jet aircraft indicating turbulence sensor airspeed transducer mounting locations in accordance with the principles of the present invention. When a single turbulence energy sensor or turbulence intensity sensor is used, a preferred mounting location 51 is at the side of the nose of fuselage 50, with the turbulence sensor airspeed transducer 51 horizontally mounted so as to be responsive to flow in the vertical longitudinal fore-aft plane as heretofore described. A single measuring point suffices in order to obtain a time-history of in-flight turbulence exposure for the life of the aircraft. When a linear airspeed transducer is used to sense dynamic airspeed it optimally benefits the taking of a turbulence energy exposure record. Without linearization, a turbulence intensity record can be appropriate since the turbulence energy signal is continuously being divided by the non-linear mean airspeed signal thereby providing a piece-wise look at continuing turbulence exposure that is being continuously corrected for mean airspeed variations.

An important embodiment of the instant invention is disclosed by the mounting of a fore and aft pair of turbulence sensors, 51 and 52, on the fuselage 50 of the aircraft. Both sensors, whether they are turbulence energy sensors or turbulence intensity sensors, should be as alike as possible in order to facilitate correlation of their signal outputs. Such correlation can signify whether or not a progressive change is taking place in the mechanical structure of the airframe that may cause changes in the elastic structure between both sensor, 51 and 52, mounting points. With no structural changes, the pattern of correlation between continuous sensor output readings should remain the same. With structural change, such as fatigue cracking or stress cracking of structural elements, the rear sensor 52 will see a different pattern of turbulence measurement than its historical correlation pattern when compared with forward sensor 51. The sensor 52 will move more erratically or be "jerked" around by irregular fuselage 50 motions that may be magnified by the long fuselage moment arm from sensor 52 to the center-of-gravity or metacenter, the center-of-motion, of the airplane. Engine pylon structural attachment cracking has happened on several occasions to aging aircraft with tragic results. It can be reasoned that such hazardous structural conditions are able to be sensed as they are happening, before catastrophic failure occurs.

In a preferred embodiment, a thermal anemometer airspeed transducer is capable of rapid response sensitive local flow detection when the air flows past it or when it passes through the air. In paired mounting applications, such as herein disclosed, a thermal anemometer airspeed transducer is less complex and more economically installed than conventional pilot based transducer systems.

In a further embodiment of the instant invention, it is shown to mount a turbulence sensor pair, 54 and 55, at or near each wing tip 53 of an aircraft. Horizontal airspeed gradient variations, and more particularly, horizontal turbulence energy variations, are easily detected by looking at the signal differences between the outputs of sensors 54 and 55. Horizontal wind gradients may be experienced during certain turbulence encounters in the atmosphere and are noteworthy in proximity to jet stream winds, aircraft trailing vortex turbulence wakes, contrails, wind shear conditions, and similar causes of local airflow differences over a fairy short distance. In particular, aircraft trailing wake vortices can persist for long time intervals after passage of the aircraft generating the wake, especially in regions of undisturbed or smooth air. In time, the vortices tend to grow in cross-section size as they dissipate. Penetrating aircraft airspeed differences from wing tip to wing tip can be substantial. A change in locally sensed turbulence eddy kinetic energy levels or turbulence energy, from wing tip to wing tip, taken as energy level differences, can be used to signal the probable approach of a turbulence condition as the aircraft enters the low level skirt region or region of increasing threshold turbulence before its magnitude becomes significantly large enough to adversely affect aircraft operation. Detection and measurement of inflight variations in horizontal airstream gradients contribute to airframe structural integrity predictions that are based on actual dynamic turbulence energy exposure time histories.

Figure 9:
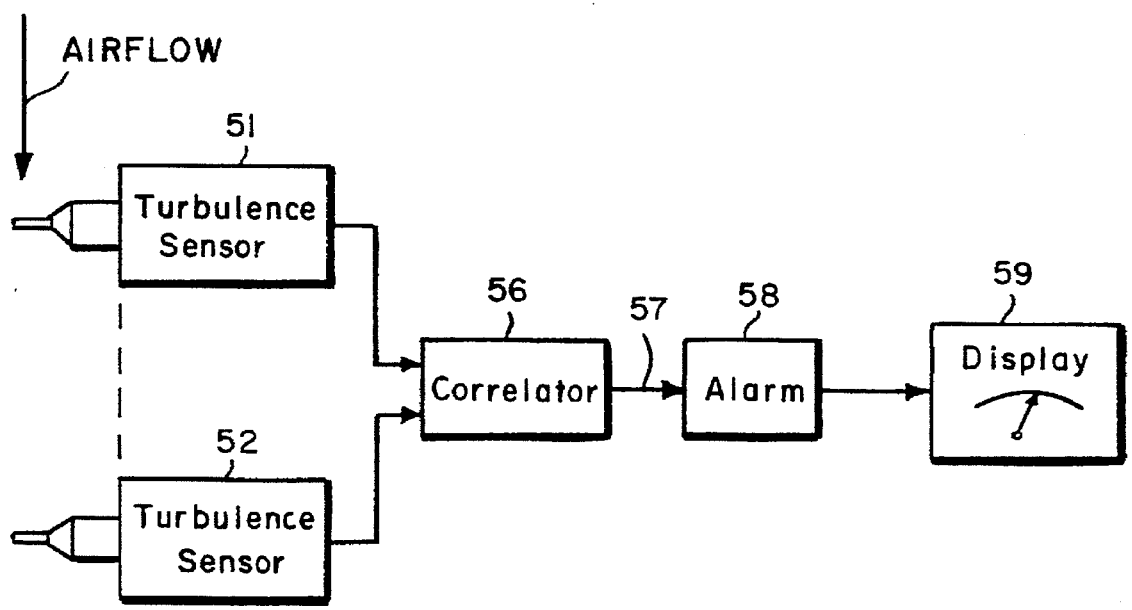
FIG. 9 is a simplified block diagram of an aircraft turbulence reporting system made in accordance with the principles of the present invention.

FIG. 9 illustrates a simplified block diagram of an aircraft reporting and alarm display system made in accordance with the principles of the instant invention. Using the notation of FIG. 8, for example, airplane fuselage 50 mounted turbulence sensors 51 and 52 feed output signals to correlator means 56 that can be as simple as a difference amplifier together with output signal level comparators, whose output 57 in turn can be fed to an alarm circuit 58 and also a display 59. Space on an airplane cockpit instrument panel is limited and it is doubtful whether such a display would be installed since the longitudinal correlation information obtained is of greater significance to maintenance personnel. In the case of lateral correlation, between wing tip mounted sensors 54 and 55, immediate knowledge of increasingly sharp gradients can be used by the pilot to initiate evasive action when needed. In this latter instance a cockpit display 59, together with alarm circuit 58, becomes of great significance respecting safety of flight.

A helpful discussion of atmospheric turbulence spectra and correlation can be found in pages 175–197 of a book entitled "The Structure of Atmospheric Turbulence", by John A. Lumley and Hans A. Panofsky, published in 1964 by Interscience Publishers, a division of John Wiley & Sons, New York, Library of Congress Catalog Card Number 64-14991. A more recent general discussion can be found in pages 29–32 and 207–211 of a book entitled "A First Course in Turbulence", by H. Tennekes and J. L. Lumley, published by The MIT Press, Cambridge, Mass., 1972, ISBN 0 262 200 19 8.

FIG. 10 depicts a structure for airspeed transducer pylon 13 that supports and orients thermal anemometer transducer sensing element 12 in respect to impinging airflow. Fabrication is customarily of stainless steel, for pylon 13 and mounting flange 60, and hard anodized aluminum alloy for the tip portion 61 housing sensing element 12. It is preferred to protect exposed sensing element 12 with a sheath such as stainless steel, dense aluminum oxide, or a vitreous refractory material that is able to withstand continuous particle carrying airstream abrasion in order to avoid erosion caused dimensional changes. Dimensional changes can adversely affect heated sensing element 12 heat transfer coefficients, thereby changing airspeed transducer calibration. A semi-resilient material could also be used, such as Teflon (a trademark), which has been experimentally verified confirming resistance to such abrasion.

In a further embodiment of the instant invention, it should be noted that by a combination of a turbulence sensor having sensing element 12 together with a ducted thermal anemometer transducer, a determination of fast response airspeed, with measured turbulence, as well as angle-of-attack is facilitated.

Further, in respect to FIG. 10, ducts 63 and 64 are shown illustrating inclusion of ducted thermal anemometer structure used for concurrent angle-of-attack or impinging flow direction sensing.

Figure 11:
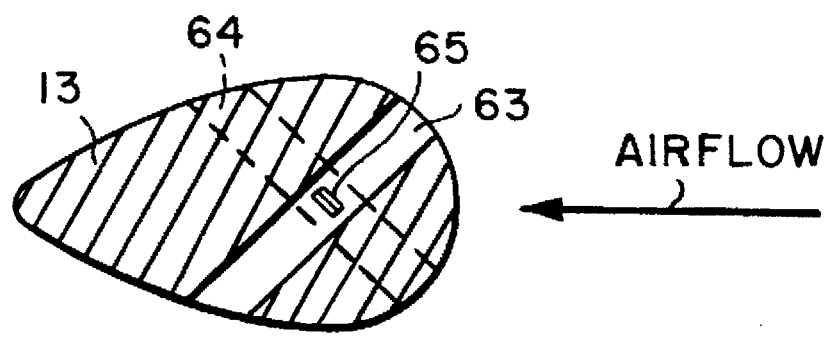
FIG. 11 is an elevational section view through the turbulence sensor airspeed transducer illustrated in FIG. 10, taken along the line 2—2 thereof, and looking in the direction of the arrows.

FIG. 11 is an elevational section view showing ducted thermal anemometer structure illustrated in FIG. 10 through pylon 13, taken along the line 2—2 thereof, and looking in the direction of the arrows. Orthogonal duct pair 63 and 64 are shown, oriented in the plane of incident airflow, with paired thermal anemometer resistive sensing elements 65 located at or near their midpoints. For clarity, paired elements are not shown pictorially across duct 64, lying underneath and alongside duct 63. A plane parallel to the longitudinal axes of ducts 63 and 64 is perpendicular to the longitudinal axis 62 of thermal anemometer airspeed transducer sensing element 12 illustrated in FIG. 10.

It should be noted that when a mean airspeed component is always present, as against an aircraft in flight, duct 63 and 64 reverse airflow cannot occur. Therefore, in yet a further embodiment, paired sensing elements 65 may be replaced by a single transverse sensing element in ducts 63 and 64 to detect duct airflow.

Low speed aircraft, helicopters in particular, as well as VSTOL aircraft (vertical or short take-off and landing aircraft), benefit by use of the above disclosed embodiments of a combination turbulence sensor, including both airspeed and direction sensors, serving as a low speed airspeed sensor that is capable of making airspeed component determinations to near zero airspeed. These instrument characteristics augment the disclosed embodiments defining turbulence sensor measurements of turbulence energy and turbulence intensity.

The more general case of higher speed aircraft is also well-served in that, from angle-of-attack determinations made by a coherent or very closely situated sensor, airspeed turbulence vector component magnitudes can readily be computed, thus aiding after-the-fact investigation of aircraft operations.

The ultimate turbulence energy bandwidth reduction can be demonstrated in the form of a single numerical value. If all accumulated and stored measured turbulence energy exposure values are integrated or summed, a single number can be obtained to describe the individual aircraft's cumulative turbulence exposure during its entire prior flight history. In this way a turbulence exposure summary indicator or index can be determined for a particular aircraft that may be used to describe a type or class of aircraft when historical performance, relating to aircraft safety, is to be considered or compared from airframe to airframe.

The above description presents the best mode contemplated in carrying out the invention. The invention is, however, susceptible to modifications and alternate constructions from the embodiments shown in the drawing and described above. Consequently, it is not the intention to limit the invention to the particular embodiments disclosed. On the contrary, the invention is intended and shall cover all modifications, arrangements and alternate constructions falling within the spirit and scope of the invention, as expressed in the appended claims when read in the light of the description and drawing.

What is claimed is:

1. A turbulence sensor comprising:

thermal anemometer airspeed transducer means providing fast response airspeed signal output;

said airspeed signal output operatively connected to bandpass filter means thereby providing defined bandwidth turbulence component signal;

said turbulence component signal operatively connected to root-mean-square signal measurement means thereby providing measurement of turbulence eddy kinetic energy;

said airspeed signal output operatively connected to lowpass filter means thereby providing mean airspeed component signal, and division means whereby said measurement of turbulence eddy kinetic energy is divided by said mean airspeed component signal thereby providing measurement of turbulence intensity.

2. A turbulence sensor comprising:

thermal anemometer airspeed transducer means sensing airflow against said airspeed transducer means thereby providing a dynamic airspeed signal;

bandpass filter means operatively connected to signal output of said airspeed transducer, said filter means defining dynamic signal response frequency bandwidth for said dynamic airspeed signal thereby providing a turbulence component of said dynamic airspeed signal;

root-mean-square computation means operatively connected to output of said bandpass filter means, said computation means measuring power in said dynamic airspeed signal turbulence component thereby providing a measure of turbulence energy;

integration means operatively connected to output of said root-mean-square computation means whereby said integration means accumulates value of said turbulence energy, wherein said integration means includes provision for resetting to zero when output is sampled;

analogue-to-digital signal conversion means operatively connected to output of said integration means thereby providing periodic samples of integrated value of said turbulence energy;

digital storage means operatively connected to output of said analogue-to-digital converter means thereby storing said samples of turbulence energy, said digital storage means comprising two sections, a first storage section to accumulate successive samples of integrated turbulence energy for a set time interval, and a second storage section periodically loaded with an arithmetic total of the value of said samples of integrated turbulence energy accumulated for said time interval, clearing and resetting said first storage to zero upon each successive loading, with said second storage section comprising non-destructive memory storage means to record turbulence energy time history for later readout, inspection, and historical review of said airspeed transducer's long term airstream turbulence exposure, and microprocessor means for control and signal processing of said turbulence energy signal.

3. A turbulence sensor comprising:

thermal anemometer airspeed transducer means sensing airflow against said airspeed transducer means thereby providing a dynamic airspeed signal;

bandpass filter means operatively connected to signal output of said airspeed transducer, said filter means defining dynamic signal response frequency bandwidth for said dynamic airspeed signal thereby providing a turbulence component of said dynamic airspeed signal;

analogue-to-digital signal conversion means operatively connected to output of said bandpass filter means thereby providing sampled digital representation of said turbulence component of said dynamic airspeed signal;

root-mean-square computation means operatively connected to said conversion means output thereby measuring power in said dynamic airspeed signal turbulence component there with providing a measure of turbulence energy;

digital storage means operatively connected to output of said computation means thereby storing computation of said turbulence energy, said digital storage means comprising two sections, a first storage section to facilitate integration of said turbulence energy for a set time interval, and a second storage section periodically loaded with an arithmetic total of the integrated value of said turbulence energy accumulated for said time interval, clearing and resetting said first storage to zero upon each successive loading, with said second storage section comprising nondestructive memory storage means to record turbulence energy time history for later readout, inspection, and historical review of said airspeed transducer's long term airstream turbulence exposure, and microprocessor means for control, signal processing and computation of said turbulence energy signal.

4. A turbulence sensor comprising:

thermal anemometer airspeed transducer means sensing airflow against said airspeed transducer means thereby providing a dynamic airspeed signal;

bandpass filter means operatively connected to signal output of said airspeed transducer, said filter means defining dynamic signal response frequency bandwidth for said dynamic airspeed signal thereby providing a turbulence component of said dynamic airspeed signal;

lowpass filter means operatively connected to signal output of said airspeed transducer, said lowpass filter means limiting response frequency of said dynamic airspeed signal thereby providing a mean airspeed component of said dynamic airspeed signal;

root-mean-square computation means operatively connected to output of said bandpass filter means, said computation means measuring power in said dynamic airspeed signal turbulence component;

division means whereby said turbulence component power is divided by said mean airspeed signal thereby providing a turbulence intensity signal;

integration means operatively connected to output of said division means thereby integrating and accumulating value of said turbulence intensity signal, wherein said integration means includes provision for resetting to zero when output is sampled;

analogue-to-digital signal conversion means operatively connected to said integration means output thereby providing periodic digital samples of said turbulence intensity signal integrated value, resetting said integration means to zero with each successive sample taking;

digital storage means operatively connected to said conversion means to store said samples of turbulence intensity, said digital storage means comprising two sections, a first storage section to accumulate successive samples of integrated turbulence intensity for a set time interval, and a second storage section periodically loaded with an arithmetic total of the value of said samples of integrated turbulence intensity accumulated for said time interval, clearing and resetting said first storage to zero upon each successive loading, with said second storage section comprising nondestructive memory storage means to record turbulence energy time history for later readout, inspection, and historical review of said airspeed transducer's long term airstream turbulence exposure, and microprocessor means for control and signal processing of said turbulence intensity signal.

5. A turbulence sensor comprising:

airspeed transducer means sensing airflow against said airspeed transducer means thereby providing a dynamic airspeed signal;

bandpass filter means operatively connected to signal output of said airspeed transducer, said filter means defining dynamic signal response frequency bandwidth for said dynamic airspeed signal thereby providing a turbulence component of said dynamic airspeed signal;

low pass filter means operatively connected to signal output of said airspeed transducer, said lowpass filter means limiting response frequency of said dynamic airspeed signal thereby providing a mean airspeed component of said dynamic airspeed signal;

analogue-to-digital signal conversion means providing sampled digital representation of said turbulence component and sampled digital representation of said mean airspeed component of said dynamic airspeed signal;

root-mean-square digital computation means measuring power in said dynamic airspeed signal turbulence component;

digital division means whereby said turbulence component digital power signal is divided by said digitally represented mean airspeed signal thereby providing a digitally represented turbulence intensity signal;

digital storage means operatively connected to said division means to store turbulence intensity signal, said digital storage means comprising two sections, a first storage section to accumulate successive samples of computed turbulence intensity for a preset time interval, and a second storage section periodically loaded with an arithmetic total of the value of said samples of turbulence intensity accumulated for said time interval, clearing and resetting said first storage to zero upon each successive loading, with said second storage section comprising non-destructive memory storage means to record turbulence intensity time history for later readout, inspection, and historical review of said airspeed transducer's long term airstream turbulence exposure; and microprocessor means for control, signal processing and computation of said turbulence intensity signal.

6. The turbulence sensor of claim 1, 2, or 3, further comprising:

level comparison and detection means whereby magnitude of said measure of turbulence energy is used to operate an alarm signal when a predetermined turbulence level is exceeded.

7. The turbulence sensor as defined in claim 2, 3, 4 or 5, wherein:

said second storage section of said digital storage means comprises ROM means, read-only-memory means.

8. The turbulence sensor as defined in claim 2, 3, 4 or 5, wherein:

said second storage section of said digital storage means comprises continuous magnetic tape storage means.

9. The turbulence sensor as defined in claim 2, 3, 4 or 5, wherein:

said digital storage means comprises disc storage means.

10. A turbulence sensor according to claims 1, 2, 3, 4 or 5 comprising:

an aircraft on which are located plural thermal anemometer turbulence sensors exposed to longitudinal airflow at widely separated mounting points, correlation means to determine degree of correlation between said turbulence sensor signals from said plural turbulence sensors, and means indicating degree of correlation determination.

11. The turbulence sensor of claim 3 or 5, further comprising:

means for permanently recording a single numerical value of stored said time history taken by said microprocessor computation means as a cumulative weighted arithmetic total representing all stored and accumulated said turbulence values, said numerical value being continually updated as said turbulence sensor is operated, thereby providing a turbulence exposure summary indicator.

* * * * *